United States Patent [19]

Dillon

[11] Patent Number: 4,554,987
[45] Date of Patent: Nov. 26, 1985

[54] SELF-ALIGNING SCALE ASSEMBLY AND METHOD

[76] Inventor: Benny N. Dillon, 6541 Plesenton Dr., Worthington, Ohio 43085

[21] Appl. No.: 527,325

[22] Filed: Aug. 29, 1983

[51] Int. Cl.[4] ...................... G01G 19/02; G01G 21/24
[52] U.S. Cl. ........................................ 177/134; 177/1; 177/255; 177/DIG. 9
[58] Field of Search ................... 177/134, 211, 255, 1, 177/DIG. 9

[56] References Cited

U.S. PATENT DOCUMENTS

| | | |
|---|---|---|
| 2,430,702 | 11/1947 | Bohannan . |
| 2,666,634 | 1/1954 | Williams . |
| 2,962,275 | 11/1960 | Thurston . |
| 3,915,248 | 10/1975 | Paelian . |
| 3,997,014 | 12/1976 | Soderholm et al. . |
| 4,248,317 | 2/1981 | Rahav ............................ 177/255 X |
| 4,258,810 | 3/1981 | Susor . |
| 4,258,814 | 3/1981 | Dillon . |
| 4,266,624 | 5/1981 | Dillon et al. . |

OTHER PUBLICATIONS

Brochure Published by Reliance Electric–Copyright 1982 Entitled Toledo 934 Cap–Check Cell.
Publication, Believed to be by Avery in United Kingdom.
Leaflet by Masstron Scale Inc.

Primary Examiner—George H. Miller, Jr.
Attorney, Agent, or Firm—Yount & Tarolli

[57] ABSTRACT

An improved scale includes a movable platform which is supported by a plurality of force transmitting assemblies. Upon sideways movement of the platform, the force transmitting assemblies and platform interact to align the force transmitting assemblies and to center the platform. In one embodiment of the invention, each force transmitting assembly includes a slider which is movable along a base surface. A rocker pin transmits force between the slider and a load cell beam which is connected with the platform. When the platform is moved sideways relative to the base, the rocker pin is tilted to a maximum offset condition in which horizontally offset vertical force components are applied to the rocker pin. Continued sideways movement of the platform relative to the base results in movement of the slider relative to the base. When movement of the platform is interrupted by engagement with a bumper, the horizontally offset vertical force components applied to the rocker pin cause it to tilt to an aligned condition in which only vertically aligned force components are applied to the rocker pin. In another embodiment of the invention, the slider and a spherical force transmitting member are connected with the base and the platform moves sideways relative to the slider when the force transmitting assembly is in a maximum offset condition.

48 Claims, 11 Drawing Figures

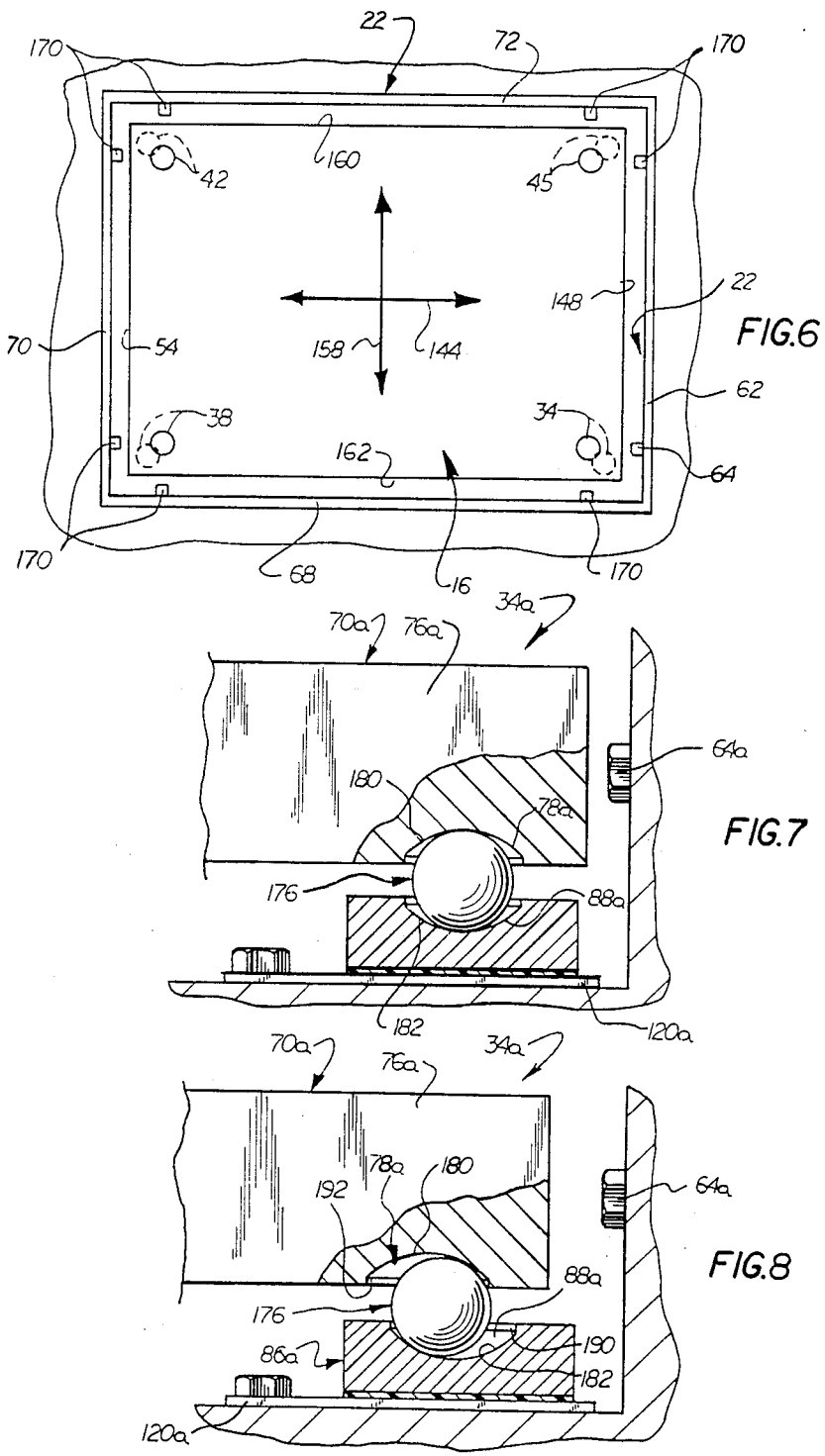

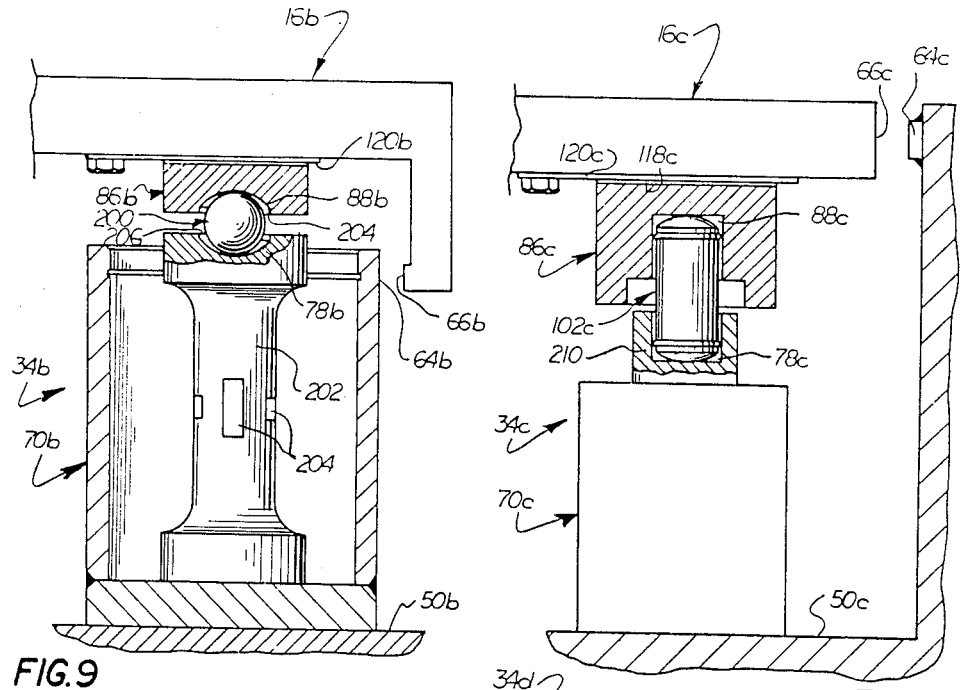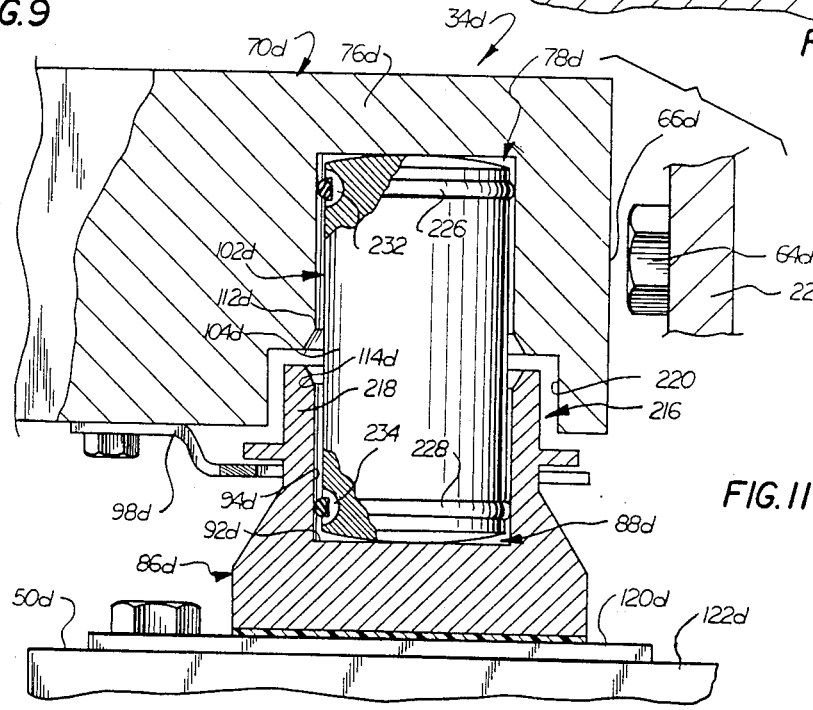

SELF-ALIGNING SCALE ASSEMBLY AND METHOD

BACKGROUND OF THE INVENTION

The present invention relates to a new and improved scale assembly and method by which it is aligned.

A known scale assembly is disclosed in U.S. Pat. No. 4,258,810. This known scale assembly includes a platform having load transmitting assemblies at each of four corners of the platform. The load transmitting assemblies include load cells having floating pins which engage a support surface and are movable along the support surface. In order to accurately center the platform relative to an enclosing framework, the floating pins must be accurately positioned relative to the support surface. In addition, the application of sideward or horizontal loads to the platform can result in abutting engagement and the transmission of horizontal forces between side surfaces of the floating pins and side surfaces of openings in the load cells.

Although a scale constructed in the manner shown in U.S. Pat. No. 4,258,810 is satisfactory in its operation, it has been found that the application of sideward or horizontal force components to a load cell tends to be detrimental to the accuracy of the scale. In addition, the time required to install the scale is increased due to the necessity of accurately positioning the platform relative to an enclosing framework.

In an effort to minimize horizontal or sideward force components in scales, rocker pins of the type shown in U.S. Pat. Nos. 2,666,634 and 3,997,014 have been used. Other scales have used spherical balls in an effort to tend to minimize horizontal force components in a manner similar to that shown in U.S. Pat. Nos. 3,915,248 and 2,430,702.

Although the use of rocker pin or ball type force transmitting members may tend to reduce the magnitude of sideward force components to which a load cell is subjected, the force transmitting members of these known scales have been associated with stationary receivers which must be accurately located. The necessity of accurately locating the stationary receivers for the rocker pins or balls of known scale assemblies increases the difficulty of installing the scale assemblies. If the receiver is to be subsequently removed for maintenance purposes, the location of the receiver must be accurately noted so that the receiver can be put back in its original position.

If stationary receivers for the rocker pins or balls of known scales are not properly located, sideward restoring forces may be permanently locked into the scales. Thus, mislocation of the receivers can cause the balls or pins to be permanently retained in an orientation which is offset or skewed relative to their intended orientation. This results in the application of sideward force components to parts of the scale. These sideward force components are detrimental to the accuracy of the scale.

BRIEF SUMMARY OF THE INVENTION

A new and improved scale assembly includes a platform which is supported by a plurality of force transmitting assemblies. The force transmitting assemblies and platform cooperate to automatically center the platform relative to an enclosing structure and to align the force transmitting assemblies and platform. The automatic centering of the platform and aligning of the force transmitting assemblies is accomplished by moving the platform back and forth in sideways directions against stops which limit motion of the platform. Centering the platform and aligning the force transmitting assemblies is effective to eliminate sideward force components on load cells in the force transmitting assemblies.

Each force transmitting assembly includes an upper member, a lower member, and a force transmitting member which is disposed between the upper and lower members. The upper, lower and force transmitting members are movable relative to each other from a maximum offset condition through a range of offset conditions to an aligned condition. When the upper and lower members are aligned, they are effective to apply only vertically aligned force components to the force transmitting member.

Accordingly, it is an object of this invention to provide a new and improved scale assembly and method to automatically center a platform and align force transmitting assemblies to transmit only vertical force components.

BRIEF DESCRIPTION OF THE DRAWINGS

The foregoing and other objects and features of the present invention will become more apparent upon consideration of the following description taken in connection with the accompanying drawings wherein:

FIG. 6 is a schematic illustration depicting the relationship between the platform and force transmitting assemblies, the force transmitting assemblies being indicated in dashed lines in a nonaligned relationship with the platform and in solid lines in an aligned relationship with the platform;

FIG. 7 is a fragmentary sectional view of an embodiment of the invention in which a spherical ball is a force transmitting member;

FIG. 8 is a fragmentary sectional view illustrating the components of the force transmitting assembly of FIG. 7 in a maximum offset condition;

FIG. 9 is a fragmentary sectional view of an embodiment of the invention in which a platform is movable relative to a load cell and a ball type force transmitting member;

FIG. 10 is a fragmentary sectional view of an embodiment of the invention generally similar to that of FIG. 9 with a rocker pin as a force transmitting member; and FIG. 11 is a fragmentary sectional view of a presently preferred embodiment of the invention.

DESCRIPTION OF SPECIFIC PREFERRED EMBODIMENTS OF THE INVENTION

Scale Assembly—General

Figure 1:
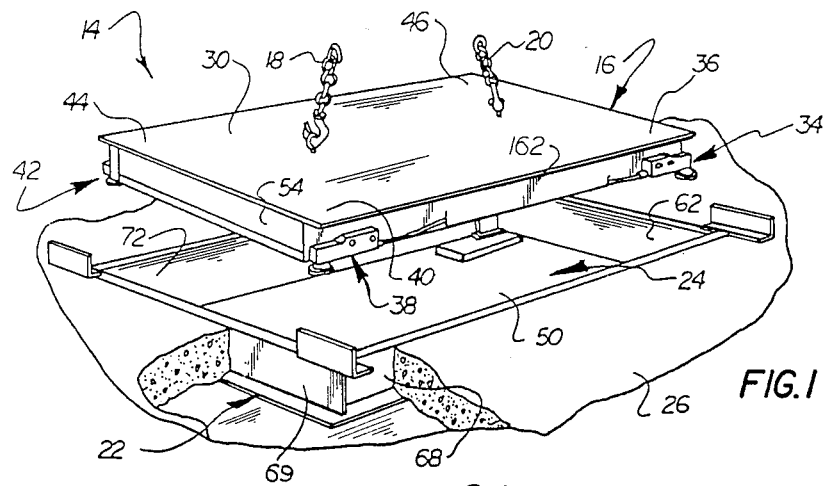
FIG. 1 is a fragmentary, pictorial illustration of the installation of a scale assembly constructed in accordance with the present invention.

The installation of a scale assembly 14 constructed in accordance with the present invention is illustrated in FIG. 1. The scale assembly 14 includes a rectangular platform 16 which receives a load to be weighed. The platform 16 is shown in FIG. 1 being lowered by chains 18 and 20 into a rectangular frame 22 disposed in a shallow pit 24 in a floor 26. When the platform 16 is disposed in the frame 22, a flat upper surface 30 of the platform is level with an upper surface of the floor 26. Although the platform 16 has been shown as having a flat upper surface, the platform could have any desired configuration suitable for receiving a load.

A force transmitting assembly constructed in accordance with the present invention is provided at each of the four corners of the rectangular platform 16. Thus, a force transmitting assembly 34 is disposed at a corner 36, a force transmitting assembly 38 is disposed at a corner 40, a force transmitting assembly 42 is disposed at a corner 44 and a force transmitting assembly 45 (shown only in FIG. 6) is disposed at a corner 46 of the platform 16. Each of the four identical force transmitting assemblies is securely connected with the platform 16 in a manner similar to that disclosed in U.S. Pat. No. 4,258,814.

When the platform 16 is lowered into the somewhat larger frame 22 (FIG. 1), the platform will not be precisely centered relative to the frame and there will probably be unequal distances between the sides of the platform and the frame. In addition, the force transmitting assemblies 34, 38, 42 and 45 will probably be in a nonaligned relationship with the platform 16. The nonaligned force transmitting assemblies will be effective to transmit sideward or horizontal force components which tend to impair the accuracy of the scale assembly 14.

In accordance with a feature of the present invention, the platform is automatically centered and the force transmitting assemblies are automatically aligned with the platform by merely moving the platform sideways relative to a base or floor 50 of the pit 24. If the force transmitting assemblies 34, 38, 42 and 45 are subsequently moved from an aligned condition (FIG. 5) to a nonaligned condition (FIG. 4), they are self-restoring to the aligned condition. This self-restoring feature of the force transmitting assemblies prevents them from being actuated to a misaligned condition by the application of operating loads to the scale assembly 14.

Centering of the platform 16 relative to the frame 22 provides a space between the platform and frame so that the platform does not abut or rub against the frame. Aligning the force transmitting assemblies 34, 38, 42 and 45 with the platform 16 results in the transmission of only vertically aligned force components which can be accurately measured by load cells. Therefore, there are no locked-in sideward force components on parts of the scale. The automatic centering of the platform and alignment of the force transmitting assemblies 34, 38, 42 and 45 facilitates the installation and subsequent maintenance of the scale assembly 14.

Figure 2:
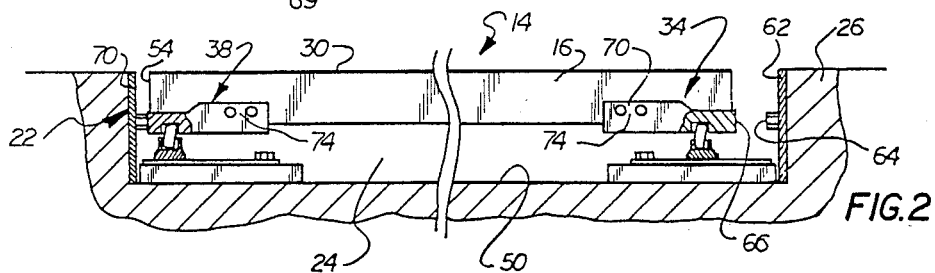
FIG. 2 is an exaggerated fragmentary schematic illustration of the scale assembly of FIG. 1 as initially installed with the platform in a noncentered relationship relative to a surrounding frame and with force transmitting assemblies in nonaligned relationships with the platform.

When the scale assembly 14 is installed, one of the platform sides, for example, the side 54 (FIG. 2), may be too close to the frame 22. In addition, the components of the force transmitting assemblies 34, 38, 42 and 45 may not be aligned properly with the platform 16. It should be noted that the extent of misalignment of the platform and force transmitting assemblies illustrated in FIG. 2 will only occur during installation and has been exaggerated in FIG. 2 for purposes of illustration.

In order to center the platform 16 in the frame 22 and align the force transmitting assemblies 34, 38, 42 and 45 with the platform 16, the platform is moved sideways toward and away from each of the four sides of the frame 22. Thus, the platform 16 is moved toward the right (as viewed in FIG. 2) toward a side 62 of the frame 22. The rightward movement of the platform is interrupted when a bumper or stop member 64 engages a stop surface 66 connected with the platform.

Once the bumper 64 has been engaged and the rightward (as viewed in FIG. 2) force on the platform 16 has been removed, restoring forces in the load transmitting assemblies 34, 38, 42 and 45 cause the platform to move toward the left (as viewed in FIG. 2) away from the bumper 64 toward a centered position. The platform 16 is then moved toward and away from each of the other three sides 68, 69 and 72 (FIGS. 1 and 6) of the frame 22. Of course the platform 16 could be moved sideways toward the corners of the rectangular frame 22 rather than toward the sides of the frame if desired.

After this has been done, the frame 16 will be disposed in a centered position and the force transmitting assemblies 34, 38, 42 and 45 will be in an aligned relationship with the platform 16. The aligned force transmitting assemblies 34, 38, 42 and 45 will then transmit only vertical force components between the platform 16 and base 50. These vertical force components can be accurately measured by load cells or other types of force transducers in the force transmitting assemblies.

Figure 3:
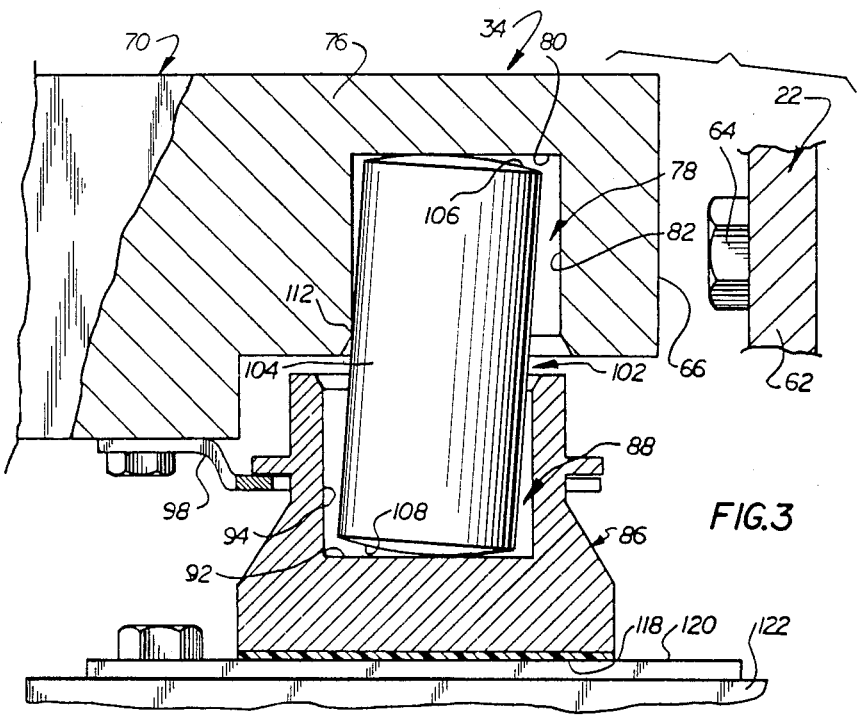
FIG. 3 is an enlarged fragmentary sectional view of one of the force transmitting assemblies of FIG. 2, the components of the force transmitting assembly being shown in a maximum offset condition with the extent of offset being exaggerated for purposes of clarity of illustration.
Figure 4:
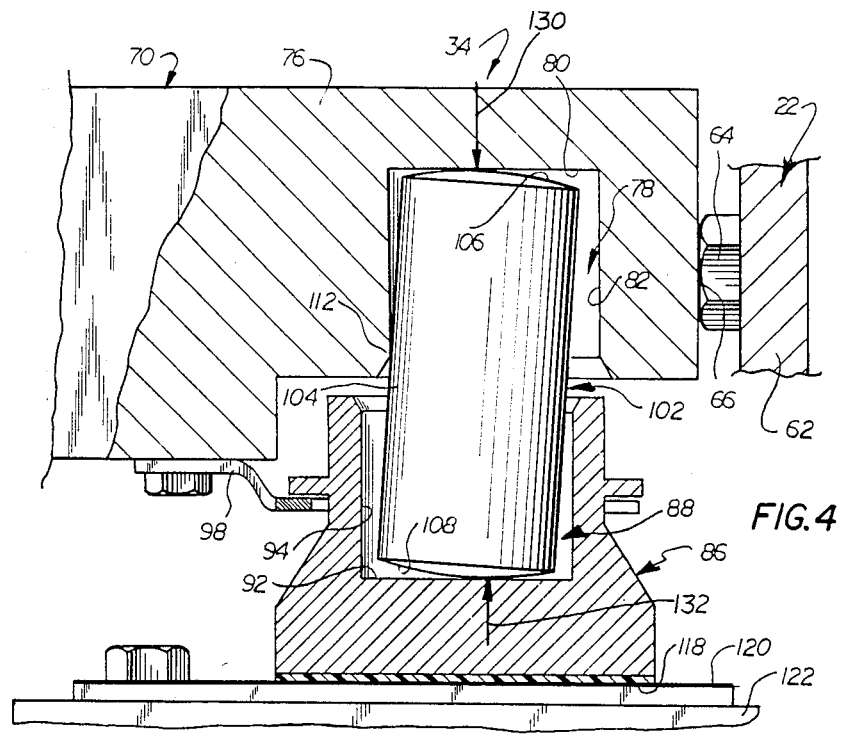
FIG. 4 is a fragmentary sectional view, illustrating the force transmitting assembly of FIG. 3 after the platform has moved sideways.
Figure 5:
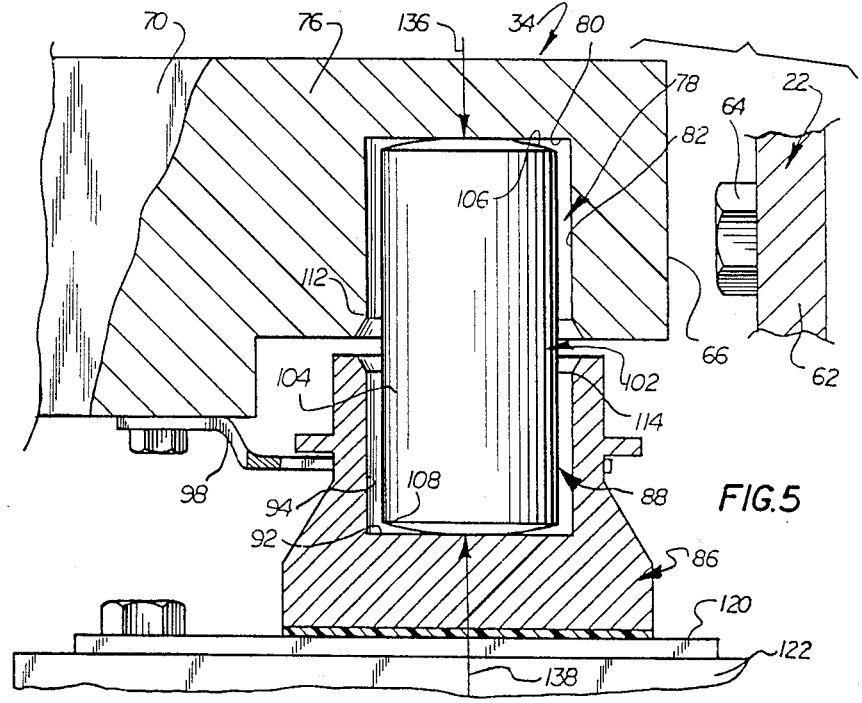
FIG. 5 is a fragmentary sectional view of the force assembly of FIGS. 3 and 4 in an aligned condition.

Force Transmitting Assembly—Embodiment of FIGS. 3-5

The force transmitting assembly 34 (FIG. 3) includes a shear beam load cell or force transducer 70 the type disclosed in U.S. Pat. No. 4,258,814 and made by Hottinger, Baldwin Measurements, Inc., Natick, Mass. The load cell 70 provides an output signal which is indicative of the magnitude of the vertical force applied to the load cell and, therefore, the weight of a load on the platform 16. Although it is preferred to use the shear beam load cell 70, other types of force transducers could be used if desired.

The load cell or force transducer 70 has a metal body portion 74 which is connected to the platform 16 and an outwardly projecting horizontal metal beam portion 76. Adjacent to the outer end of the beam 76 is formed a downwardly opening cylindrical recess 78. The recess 78 has a flat bottom surface 80 and a cylindrical side surface 82.

The force transmitting assembly 34 also includes a metal slider or base pad 86 disposed immediately beneath the outer end portion of the load cell beam 76. The slider 86 has an upwardly opening cylindrical recess 88 of the same size as the recess 78 in the load cell beam 76. The slider recess 88 has a flat bottom surface 92 and a cylindrical sidewall 94. During installation of the scale assembly 14, the slider 86 is retained in position beneath the beam 76 by a retainer plate or member 98 in a manner similar to that disclosed in U.S. Pat. No. 4,258,810.

A metal force transmitting member 102 extends into the recesses 78 and 88 and is effective to transmit load forces from the beam 76 to the slider 86. In the embodiment of FIG. 3, the force transmitting member 102 is a rocker pin having a cylindrical side surface 104 and end surfaces 106 and 108 which are polar portions of spheres. The arcuate end surfaces 106 and 108 abut the flat end surfaces 80 and 92 of the cylindrical recesses 78 and 88.

The cylindrical side surface 104 of the rocker pin 102 has an outside diameter which is smaller than the inside diameter of the recesses 78 and 88. Therefore, the rocker pin 102 is free to tilt from an aligned or vertical position (FIG. 5) through a plurality of offset positions to the maximum offset position shown in FIG. 3. However, it is preferred to use O-rings or other resilient elements (not shown) to urge the rocker pin 102 toward the vertical position with a force which can be easily overcome. For purposes of clarity of illustration, the extent of the tilting movement of the rocker pin has been exaggerated somewhat in FIG. 3.

When the force transmitting assembly 34 is to be aligned with the platform 16, the platform is moved toward the right (as viewed in FIGS. 2 and 3) until the stop surface 66 at one end of the load cell beam 76 abuts a bumper 64. If the components of the force transmitting assembly 34 are not in the maximum offset condition shown in FIG. 3, the initial rightward movement of the platform 16 moves the load cell beam 76 relative to the slider 86 and causes the rocker pin 102 to tilt in the maximum offset position. At this time, the vertical central axis of the upper recess 78 is offset from the vertical central axis of the lower recess 88.

When the force transmitting assembly 34 is in the maximum offset condition of FIG. 3, the rocker pin 102 is held against further tilting movement by engagement of the side surface 104 of the rocker pin with a circular edge portion 112 of the recess 78. Therefore, once the force transmitting assembly 34 has moved to the maximum offset condition shown in FIG. 3, the spatial relationship between the load cell 76, rocker pin 102 and slider 86 remains constant as the platform continues to move toward the right. This results in sliding movement of a Teflon covered circular bottom surface 118 of the slider 86 along a slider plate 120 preferably of stainless steel which is connected to a stationary base plate 122.

The coefficient of friction between the Teflon coated bottom surface 118 of the slider 86 and the upper surface of the metal slider plate 120 is substantially less than the coefficient of friction between the ends 106 and 108 of the metal pin and the surfaces 80 and 92 on the load cell beam 76 and slider 86. Therefore, sliding movement occurs between the bottom surface 118 and the slider plate 120 before sliding movement can occur between the rocker pin 102 and either the load cell beam 76 or between the rocker pin and the slider 86. It should be noted that the coefficient of friction between the lower end of the rocker pin 102 and the slider 86 must be greater than the coefficient of friction between the slider and the slider plate 120. The commonly accepted coefficient of friction between the metal rocker pin 102 and slider 86 is approximately 0.7. The commonly accepted coefficient of friction between the Teflon bottom surface 118 of the slider 86 and the slider plate 120 is approximately 0.06.

Upon engagement of the stop surface 66 with the bumper 64 (see FIG. 4), rightward movement of the platform 16 movement is interrupted. When the force urging the platform 16 toward the right is removed, the restoring forces in the force transmitting assembly 34 cause the force transmitting assembly to move from the maximum offset condition in FIG. 4 to the aligned condition shown in FIG. 5. When the force transmitting assembly 34 is in the aligned condition, the vertical central axis of the upper recess 78 is aligned with the vertical central axis of the lower recess 88.

As the force transmitting assembly 34 moves from the maximum offset condition of FIG. 4 to the aligned condition of FIG. 5, the rocker pin 102 is effective to cause the load cell beam 76 and platform 16 to move toward the left away from the bumper 64. Thus, when the force transmitting assembly 34 is in a maximum offset condition shown in FIG. 4, the bottom surface 80 of the recess 78 is effective to apply a downward load force component, indicated at 130 in FIG. 4, to the left side of the dome shaped upper surface 106 on the rocker pin 102. The stationary slider 86 applies an upwardly directed reaction force, indicated at 132 in FIG. 4, against the right side of the dome shaped lower surface 108 on the rocker pin 102.

The vertical force components 130 and 132 are of equal magnitude and are horizontally offset. Therefore, the force components 130 and 132 apply a counterclockwise (as seen in FIG. 4) torque to the rocker pin 102. The counterclockwise torque applied to the rocker pin 102 by the horizontally offset force components 130 and 132 is transmitted to the load cell beam 76 and is urges the load cell beam and platform 16 toward the left (as viewed in FIG. 4).

Although only force transmitting assembly 34 has been shown in FIG. 4, it should be understood that the force transmitting assemblies 38, 42 and 45 at the other corners of the platform 16 are in similar orientations and are effective to apply force to the platform urging it towards the left (as viewed in FIG. 4). This results in movement of the platform 16 and load cell beam 76 leftward from the position shown in FIG. 4 to the aligned position shown in FIG. 5. As the load cell beam 76 and platform 16 move toward the left away from the bumper 64, the slider 86 remains stationary and the rocker pin 102 pivots to an upright orientation.

When the force transmitting assembly 34 is in the aligned condition, the bottom surface 80 of the load cell beam 76 applies a vertical downwardly directed load force component, indicated at 136 in FIG. 5, against the upper surface 106 of the rocker pin 12. Similarly, the bottom surface 92 of the recess 88 in the slider 86 is effective to apply an upwardly directed vertical reaction force component 138 against the lower side surface 108 of the rocker pin 102. The force components 136 and 138 are coincident with the central axis of the rocker pin 102 and the central axes of the cylindrical recesses 78 and 88. The axially aligned vertical force components 136 and 138 did not apply any moments to the rocker pin 102. Therefore, sideward or horizontal forces are not applied to the load cell beam 76.

Each of the force transmitting assemblies at the four corners of the platform 16 may be out of alignment with the platform 16 in a different direction. Therefore, it is necessary to move the platform 16 back and forth along horizontal X and Y axes in order to be certain that all four of the force transmitting assemblies are aligned with the platform and that the platform is centered relative to the frame 22. Thus it is necessary to move the platform 16 horizontally back and forth, in the manner indicated by the arrow 144 in FIG. 6, to align the force transmitting assemblies 34, 38, 42 and 45 along the X axis and to position the sides 54 and 148 of the platform 16 relative to the sides 62 and 70 of the frame 22. In addition, it is necessary to move the platform 16 horizontally back and forth along the Y axis in the manner indicated by the arrow 158 in FIG. 6. This aligns the force transmitting assemblies 34, 38, 42 and 45 along the Y axis and centers the sides 160 and 162 of the platform 16 relative to the sides 68 and 72 of the frame 22.

As the platform 16 is moved horizontally back and forth along the X and Y axes in the manner indicated by the arrows 144 and 158 in FIG. 6, the force transmitting assemblies 34, 38, 42 and 45 move from the non-aligned conditions indicated in dashed lines in FIG. 6 to the aligned conditions indicated in solid lines in FIG. 6. Suitable bumpers 170 are provided along the frame 22 to limit the sideways movement of the platform 16 in the same manner as previously explained in connection with the bumper 64. When the force transmitting assemblies 34, 38, 42 and 45 are in the aligned condition shown in solid lines in FIG. 6, the upwardly facing recesses 88 in the sliders 86 are aligned with the downwardly facing recesses 78 in the load cells 70.

If the distance between each of the stop surfaces connected to the platform 16 and each of the bumpers connected to the frame 22 is equal to or slightly less than the distance which the components of the force transmitting assembly 34 move from the maximum offset condition of FIG. 4 to the aligned condition of FIG. 5, the centered position of the platform will not change during use of the scale assembly. This allows vehicles to be driven onto and off of the platform without permanently changing the centered condition of the platform.

If a dynamic load is applied to the platform 16 and moves the platform toward the right, as seen in FIG. 6, the load cell beam 76 will move into an abutting engagement with the bumper 64 as the force transmitting assembly 34 is actuated to the maximum offset condition (see FIG. 4). This occurs while the slider 86 remains stationary. Therefore, the restoring forces in the force transmitting assembly 34 will return the force transmitting assembly to the aligned condition shown in FIG. 5. Simultaneously therewith, the platform 16 will be returned to its previous centered position. A dynamic load could be applied to the platform 16 in many different ways, for example, a vehicle could be driven onto the platform or a conveyor extending onto the platform could be started or stopped.

It is contemplated that the distance between bumpers on opposite sides of the frame 22 may be such as to allow the platform to move slightly toward either the left or the right (as viewed in FIG. 6) between centered positions. Thus, the space in between the bumpers could be increased slightly so that each time a vehicle moves onto and off of the platform, the force transmitting assemblies 34, 38, 42 and 45 move to the maximum offset condition (shown in FIG. 4) and then continue to move through a short distance into engagement with the bumpers. This would result in realignment of the force transmitting assemblies 34, 38, 42 and 45 with the platform 16 each time a vehicle is driven onto or off of the platform. Of course, the platform would also be centered in the frame 22 each time a vehicle was driven onto or off of the platform 16.

Although the construction of only the force transmitting assembly 34 is illustrated in FIGS. 3-5, it should be understood that the force transmitting assemblies 38, 42 and 45 have the same construction and mode of operation as the force transmitting assembly 34. It should also be understood that the scale assembly 14 can be used for purposes other than weighing vehicles. Thus, other types of loads could be placed on the platform 16 and weighed by the load cells in the force transmitting assemblies. Of course, the platform could be shaped differently than shown in the drawings in order to receive a particular load.

If it becomes necessary to remove one of the load cells for maintenance, it is merely necessary to raise the platform 16, replace the load cell, and then return the platform to its position in the frame 22. The platform 16 would then be moved along the X and Y axes to align the force transmitting assemblies 34, 38, 42 and 45 and to center the platform in the frame 22 in the manner previously explained.

Force Transmitting Assembly—Embodiment of FIGS. 7 and 8

It is contemplated that a force transmitting member other than a rocker pin may be used between a slider and a load cell beam. Thus in the embodiment of the invention shown in FIGS. 7 and 8, a spherical ball 176 is used as a force transmitting member. Since the construction of the force transmitting assembly shown in FIGS. 7 and 8 is generally similar to the construction of the force transmitting assembly shown in FIGS. 3-5, similar numerals will be utilized to designate similar components, the suffex letter "a" being associated with the embodiment of the invention shown in FIGS. 7 and 8 to avoid confusion.

The spherical load transmitting member or ball 176 is disposed in a downwardly opening recess 78a formed in the load cell beam 76a and in an upwardly opening recess 88a formed in the slider 86a. The recesses 78a and 88a have bottom surfaces 180 and 182 which form polar portions of spheres having larger radii than the spherical ball 176.

When the force transmitting assembly 34a is in the maximum offset condition illustrated in FIG. 8, the lower portion of the ball 176 is in engagement with a cylindrical rim 190 of the recess 88a. Similarly, the ball 176 engages a cylindrical rim 192 of the recess 78a. At this time, the recess 78a is offset to the left of the recess 88a.

Further leftward (as viewed in FIG. 8) movement of the platform and load cell beam 76a results in movement of the slider 86a along a stainless steel base plate or shim 120a. During this leftward movement of the load cell beam 76a, the relationship between the slider 86a, spherical ball 176 and load cell beam remains constant in the maximum offset condition shown in FIG. 8.

When the leftward movement of the load cell beam 76a is interrupted and the sideways force applied to the platform is withdrawn, the restoring forces on the ball 176 cause it to return the force transmitting assembly 34a to the aligned condition of FIG. 7. The restoring forces on the ball 176 include a downward vertical force component applied against the upper right (as viewed in FIG. 8) portion of the ball by the load cell beam 76a and an upward vertical reaction force component applied against the lower left portion of the ball by the slider 86a. The horizontally offset vertical force components on the ball 176 apply a clockwise moment to the ball. This moment urges the load cell beam 76a and platform toward the right as viewed in FIG. 8.

When the ball 176 has moved the load cell beam 76a to the aligned condition shown in FIG. 7, the recesses 78a and 88a are vertically aligned. The vertical downward load force component on the upper portion of the ball extends through the center of the ball and is aligned with a vertical upward reaction force component at the bottom portion of the ball. Therefore, there are no horizontal or sideward force components transmitted between the slider 86a and load cell beam 76a.

Force Transmitting Assembly—Embodiment of FIG. 9

In the embodiment of the force transmitting assembly shown in FIGS. 3-5, the slider 86, rocker pin 102 and load cell beam 76 move together relative to the base plate 122 when the platform 16 is moved to the right with the load transmitting assembly in the maximum offset condition shown in FIG. 3. This results in sliding movement of the bottom surface 118 of the slider 86 along the top surface of the stainless steel plate 120. In the embodiment of the invention shown in FIG. 9, the slider engages a surface connected to the platform.

Once the force transmitting assembly shown illustrated in FIG. 9 has been actuated to a maximum offset condition, the slider and ball-type force transmitting member remain stationary while the platform moves relative to the slider. In addition, in the embodiment of the invention shown in FIG. 9, a stop surface is fixedly connected with the platform and moves into engagement with a bumper surface on a stationary load cell housing when the platform has reached a limit of movement in one direction. Since the embodiment of the invention shown in FIG. 9 is generally similar to the embodiments of the invention shown in FIGS. 3-5, similar numerals will be utilized to designate similar components, the suffix letter "b" being associated with the numerals of FIG. 9 to avoid confusion.

Load forces are transmitted from the platform 16b through a force transmitting assembly 34b to a base 50b. The force transmitting assembly 34b includes a slider 86b having a downwardly opening recess 88b. The upper portion of an force transmitting member or spherical ball 200 extends into the recess 88b. A lower portion of the ball 200 extends into an upwardly opening recess 78b formed in the upper end portion of a stationary column 202 of the load cell 70b. Suitable strain gages 204 are connected with the load cell column 202 to provide an output indicative of the load applied to the column.

When the platform 16b move toward the left (as viewed in FIG. 9) the slider 86b moves with the platform until the ball 200, slider 86b and column 202 have reached a maximum offset condition corresponding to the maximum offset condition shown in FIG. 8. The leftside of the ball 200 then engages a cylindrical rim 206 of the opening 78b in the load cell column 202. The cylindrical rim 204 on the recess 88b in the slider 86b engages the right side of the ball.

Continued leftward movement (as viewed in FIG. 9) of the platform 16b results in the stainless steel shim plate moving leftwardly relative to the stationary slider 86b. The stop surface 66b engages the bumper surface 64b when the platform 16b has moved to the limit of its leftward travel. After the force urging the platform 16b toward the left is removed, the restoring forces on the ball 200 cause the ball to move the slider 86b and platform 16b to the right until the slider 86b, ball 200 and column 202 have returned to the aligned condition shown in FIG. 9. During this rightward restoring movement of the platform 16b, the slider 86b does not move relative to the platform 16b.

Force Transmitting Assembly—Embodiment of FIG. 10

It is contemplated that a rocker pin could be used in association with a force transmitting assembly having a construction similar to the construction shown in FIG. 9. Thus, in the embodiment of the invention shown in FIG. 10, a rocker pin is associated with a stationary load cell and a slider engages a movable surface on the platform. Since the embodiment of the invention shown in FIG. 10 is generally similar to the embodiment of the invention shown in FIGS. 3-5, similar numerals will be utilized to designate similar components, the suffix letter "c" being associated with the embodiment of the invention shown in FIG. 10 to avoid confusion.

The force transmitting assembly 34c transmits load forces from the platform 16c to a base 50c. The force transmitting assembly 34c includes a slider 86c a rocker pin 106c, and a load cell 70c. The upper portion of the rocker pin 102c is received in a cylindrical recess 88c in the slider 86c. The lower portion of the rocker pin 102c is received in a recess 78c in a load carrying end portion 210 of the load cell 70c.

The force transmitting assembly 34c has been shown in FIG. 10 in an aligned condition. Upon movement of the platform 16c toward the right, the rocker pin 102c tilts from the vertical or upright orientation shown in FIG. 10 through a plurality of offset positions to a maximum offset position corresponding to a position of the rocker pin 102 in FIG. 3. As the components of the force transmitting assembly 34c move to the maximum offset condition, the slider 86c does not move relative to the plate 120c on the platform 16c. Thus, the slider 86c moves with the platform 16c.

When the force transmitting assembly 36c reaches the maximum offset condition, further rightward movement of the platform 16c results in a sliding action between a teflon-covered upper side surface 118c of the slider 86c and the plate 120c. Thus, the slider 86c remains stationary while the platform 16c continues to move towards the right.

Rightward movement of the platform 16c is interrupted when the stop surface 66c engages a bumper 64c. When the force urging the platform 16c toward the right is removed, the restoring forces on the rocker pin 102c move the slider 86c and platform 16c together toward the left to the aligned condition of FIG. 10.

Force Transmitting Assembly—Embodiment of FIG. 11

The embodiment of the invention shown in FIG. 11 is similar to the embodiment of the invention shown in FIGS. 3-5. However, it is believed that the embodiment of the invention shown in FIG. 11 may be preferred. Since the embodiment of the invention shown in FIG. 11 is similar to the embodiment of the invention shown in FIGS. 3-5, similar numerals will be used to designate similar components, the suffix letter "d" being associated with the components of the invention shown in FIG. 11 in order to avoid confusion.

In the embodiment of the invention shown in FIG. 11, a force transmitting assembly 34d includes a load cell 70d having a beam 76d with a cylindrical opening 78d in which the upper end portion of a rocker pin 102d is received. The lower end portion of the rocker pin 102d extends into a cylindrical opening 88d in a slider 86d. The slider 86d engages a stainless steel shim or plate 120d fixedly connected with a base plate 122d on a base 50d. A bumper 64d is engageable with an end surface 66d of the load cell beam 76d to limit rightward (as viewed in FIG. 11) movement of the load cell beam 76d and a platform connected to the load cell beam 76d.

In accordance with a feature of the embodiment of the invention shown in FIG. 11, the load cell beam 76d is provided with a cylindrical recess 216 which is coaxial with the cylindrical recess 78d. The recess 216 circumscribes a circular collar 218 on the slider 86d.

When the force transmitting assembly 34d is in a maximum offset condition, corresponding to the condition illustrated in FIGS. 3 and 4 for the force transmitting assembly 34, the collar 218 engages a cylindrical sidewall 220 of the recess 216. The cylindrical side surface 104d of the rocker pin 102d is at all times spaced from the rims 112d and 114d of the openings 76d and 88d. Therefore, the forces which restrain the components of the force transmitting assembly 34d against further movement once they have reached a maximum offset condition are transmitted directly from the slider 86d to the load cell beam 76d. This reduces stresses on the rocker pin 102d.

A pair of annular O-rings 226 and 228 are disposed in annular slots 232 and 234 in the upper and lower end portions of the rocker pin 102d. The O-rings 226 and 228 urge the rocker pin back to the aligned condition shown in FIG. 11. The annular slots 232 and 234 have rectangular radial cross sectional configurations.

It should be understood I did not invent the concept of transmitting forces from the slider 86d directly to the load cell beam 76d by engagement of the outer side surface of the collar 218 with the inner side surface 220 the recess 216. This concept was invented by Mr. Fred H. Weihs. The embodiment of the invention shown in FIG. 11 and Mr. Weihs force transmitting concept are being described herein only for the purposes of describing what may be considered as a preferred embodiment of my invention.

SUMMARY

A new and improved scale assembly 14 includes a platform 16 which is supported by a plurality of force transmitting assemblies 34, 38, 42 and 45. The force transmitting assemblies 34, 38, 42 and 45 and the platform 16 cooperate to automatically center the platform 16 relative to an enclosing structure 22 and to align the force transmitting assemblies and platform. The automatic centering of the platform 16 and aligning of the force transmitting assemblies 34, 38, 42 and 45 is accomplished by moving the platform back and forth in sideways directions against stops 64, 170 which limit motion of the platform. Centering the platform and aligning the force transmitting asemblies 34, 38, 42 and 45 is effective to eliminate sideward force components on the load cells 70 in the force transmitting assemblies.

Each force transmitting assembly 34, 38, 42 and 45 includes an upper member 76, a lower member 86, and a force transmitting member 102 which is disposed between the upper and lower members. The upper, lower and force transmitting members 76, 86 and 102 are movable relative to each other from a maximum offset condition (FIG. 3) through a range of offset conditions to an aligned condition (FIG. 5).

When the upper and lower members 76 and 86 are aligned, they are effective to apply vertically aligned force components 136 and 138 (FIG. 5) to the force transmitting member 102. When the upper and lower members 76 and 86 are offset, they are effective to apply horizontally offset vertical force components 120 and 130 (FIG. 4) to the force transmitting member.

In order to enhance the accuracy of the scale assembly, it is desirable to have the platform 16 centered relative to a surrounding framework 22 and to have openings 78 and 88 in the upper and lower members 76 and 86 aligned so that vertically aligned force components 136 and 138 are applied to the force transmitting member 102. To obtain these ends, the platform 16 is moved back and forth in a sideways directions indicated by the arrows 144 and 158 in FIG. 6.

As the platform moves sideways in one direction, the upper, lower and force transmitting members 76, 86 and 102 move to a maximum offset condition (FIG. 3). Continued sideways movement of the platform 16 from the position shown in FIG. 3 to the position shown in FIG. 4 causes sliding movement between the slider 86 and a slider plate 120. During movement from the position shown in FIG. 3 to the position shown in FIG. 4, the upper, lower and force transmitting members 76, 86 and 102 are maintained in a maximum offset condition. Upon interruption of the sideways movement by engagement with the bumper 64, the force transmitting member 102 interacts with the upper and lower members 76 and 86 to effect relative movement between the members from the maximum offset condition (FIG. 4) to an aligned condition (FIG. 5). As the upper, lower, and force transmitting members 76, 86 and 102 move to the aligned condition, the platform 16 is moved to a centered position. When the upper, lower and force transmitting members 76, 86 and 102 are in an aligned relationship with the platform 16, the recess 78 in the upper member is aligned with the recess 88 in the lower member 86.

Having described specific preferred embodiments of the invention, the following is claimed:

1. An assembly comprising a load receiving means for receiving a load to be weighed, a plurality of force-transmitting assemblies for transmitting the load to a base, each of said force transmitting assemblies including a force measuring transducer, a slider slidable relative to said load receiving means or base, and a self-restoring force-transmitting member for vertically transmitting a force component between said slider and force measuring transducer when said slider and force measuring transducer are aligned, and means for effecting relative sliding movement between said slider and load receiving means or base to align said force measuring transducer and slider in response to sideways movement of said load receiving means.

2. An assembly as set forth in claim 1 wherein sdid means for effecting relative sliding movement between said slider and load receiving means or base includes surface means connected with said slider for engaging a portion of said force transmitting member and preventing relative movement between said slider and said force transmitting member as said load receiving means moves in a sideways direction.

3. An assembly as set forth in claim 1 wherein said means for effecting relative sliding movement between said slider and said load receiving means or base includes means for maintaining a spatial relationship between said slider and force transmitting member constant during at least a portion of the movement of said load receiving means in a first sideways direction, said force transmitting member moving said load receiving means in a second sideways direction under the influence of horizontally offset vertical force components applied to said force transmitting member upon interruption of movement of said load receiving means in the first sideways direction.

4. An assembly as set forth in claim 1 wherein said slider includes first surface means for applying force against a lower portion of said force transmitting member, and further including second surface means connected with said load receiving means for applying force against an upper portion of said force transmitting member, said upper and lower portions of said force transmitting member having surface means for cooperating with said first and second surface means to effect movement of said force transmitting member and second surface means relative to said slider upon interruption of movement of said load receiving means in a sideways direction with said slider and load receiving means in the nonaligned relationship.

5. An assembly as set forth in claim 1 wherein said slider includes first surface means for applying force against an upper portion of said force transmitting member, said force transmitting means further including second surface means connected with the base for applying force against a lower portion of said force transmitting member, said upper and lower portions of said force transmitting member having surface means for cooperating with said first and scond surface means to effect movement of said force transmitting member and slider relative to said second surface means upon interruption of movement of said load receiving means in a sideways direction.

6. An assembly as set forth in claim 1 wherein said force transmitting member has a spherical configuration.

7. An assembly as set forth in claim 1 wherein said force transmitting member is a pin having arcuate upper and lower end portions interconnected by a cylindrical body portion.

8. An assembly as set forth in claim 1 wherein said means for effecting relative sliding movement between said slider and said load receiving means or base includes means for moving said slider along with said load receiving means relative to the base during movement of said load receiving means in a sideways direction.

9. An assembly as set forth in claim 1 wherein said means for effecting relative sliding movement between said slider and said load receiving means or base includes means for enabling said load receiving means to move relative to said base and slider.

10. An assembly as set forth in claim 1 wherein said means for effecting relative sliding movement between said slider and said load receiving means or base includes means for maintaining the spatial relationship between said slider and force transmitting member constant during at least a portion of the sideways movement of said load receiving means.

11. An assembly as set forth in claim 11 wherein said means for effecting relative sliding movement further includes means for changing the spatial relationship between said slider and force transmitting member during a first portion of the sideways movement of said load receiving means and for maintaining the spatial relationship between said slider and surface constant during the second portion of the sideways movement of said load receiving means.

12. An assembly comprising a load receiving means for receiving a load to be weighed, a plurality of force-transmitting assemblies for transmitting the load to a base, each of said force transmitting assemblies including a force measuring transducer, a slider slidable relative to said load receiving means or base, a self-restoring force-transmitting member for vertically transmitting a force component between said slider and force measuring transducer when said slider and force measuring transducer are aligned, and means for effecting relative sliding movement between said slider and load receiving means or base to align said force measuring transducer and slider in response to sideways movement of said load receiving means, said force measuring transducer including surface means for defining a downwardly opening recess having a vertical central axis, said slider including surface means for defining an upwardly opening recess having a vertical central axis, an upper portion of said force transmitting member being disposed in the downwardly opening recess in said force measuring transducer and a lower portion of said force transmitting member being disposed in the upwardly opening recess in said slider, said force measuring transducer and slider being positioned with the vertical axes of the recesses horizontally offset when said force measuring transducer, slider and force transmitting member are out of alignment, said force measuring transducer and slider being positioned with the vertical axes of the recesses coincident when said force measuring transducer, slider and force transmitting member are aligned.

13. An assembly comprising load receiving means for receiving a load, said load receiving means being movable sideways relative to a base, stop means for limiting sideways movement of said load receiving means, force transmitting means for transmitting force from said load receiving means to the base, said force transmitting means including an upper member to which a load is transmitted from said load receiving means, a lower member through which a load is transmitted to the base, and a movable force transmitting member disposed in engagement with said upper and lower members, said upper, lower and force transmitting members being relatively movable from an aligned condition through a range of offset conditions to a maximum offset condition, said upper and lower members being effective to apply verically aligned force components to said force transmitting member when said members are in the aligned condition, said upper and lower members being effective to apply horizontally offset vertical force components to said force transmitting member when said members are in any one of the offset conditions, said upper, lower and force transmitting members being movable to the maximum offset condition upon sideways movement of said load receiving means in a first direction relative to the base, and means for maintaining the positions of said upper, lower and force transmitting members constant relative to each other with said force transmitting members in the maximum offset condition during continuing sideways movement of said load receiving means in the first direction relative to the base, said force transmitting member including surface means for cooperating with said upper and lower members to effect relative movement between said members from the maximum offset condition to the aligned condition and to effect movement of said load receiving means in a second sideways direction upon interruption of movement of said load receiving means in the first sideways direction.

14. An assembly as set forth in claim 13 wherein said force transmitting means includes means for defining a surface, one of said upper and lower members being diposed in abutting engagement with said surface, said one of said members and said surface being slidable relative to each other during the continued sideways movement of said load receiving means in the first direction with said upper, lower and force transmitting members in the maximum offset condition.

15. An assembly as set forth in claim 13 wherein said upper and lower members are disposed in abutting engagement with opposite side portions of said force transmitting member when said upper and lower force transmitting members are in the maximum offset condition.

16. An assembly as set forth in claim 13 wherein said force transmitting member has a spherical configuration.

17. An assembly as set forth in claim 13 wherein said force transmitting member is a rocker pin.

18. An assembly as set forth in claim 13 wherein said upper, lower and force transmitting members are moved with said load receiving means relative to the base during sideways movement of said load receiving means with said members in the maximum offset condition.

19. An assembly as set forth in claim 13 wherein said load receiving means moves relative to said upper, lower and force transmitting members during sideways movement of said load receiving means with said members in the maximum offset condition.

20. An assembly comprising load receiving means for receiving a load, said load receiving means being movable sideways relative to a base, stop means for limiting sideways movement of said load receiving means, and force transmitting means for transmitting force from said load receiving means to the base, said force transmitting means including an upper member to which a load is transmitted from said load receiving means, a lower member through which a load is transmitted to the base, a movable force transmitting member disposed in engagement with said upper and lower members, said upper, lower and force transmitting members being relatively movable from an aligned condition through a range of offset conditions to a maximum offset condition, said upper and lower members being effective to apply vertically aligned force components to said force transmitting member when said members are in the aligned condition, said upper and lower members being effective to apply horizontally offset vertical force components to said force transmitting member when said members are in any one of the offset conditions, said upper, lower and force transmitting members being movable to the maximum offset condition upon sideways movement of said load receiving means in a first direction relative to the base and being maintained in the maximum offset condition during continued sideways movement of said load receiving means in the first direction relative to the base, said force transmitting member including surface means for cooperating with said upper and lower members to effect relative movement between said members from the maximum offset condition to the aligned condition and to effect movement of said load receiving means in a second sideways direction opposite to the first sideways direction upon interruption of movement of said load receiving means in the first sideways direction, said upper member including surface means for defining a downwardly opening recess having a vertical central axis, said lower member including surface means for defining an upwardly opening recess having a vertical central axis, an upper portion of said force transmitting member being disposed in the downwardly opening recess in said upper member and a lower portion of said force transmitting member being disposed in the upwardly opening recess in said lower member, said upper and lower members being positioned with the vertical central axes of the recesses horizontally offset when said upper, lower and force transmitting members are in the offset condition, said upper and lower members being positioned with the vertical central axes of the recesses coincident when said upper, lower and force transmitting members are in the aligned condition.

21. An assembly comprising load receiving means for receiving a load, said load receiving means being movable sideways relative to a base, force measuring transducer means connected with said load receiving means for providing an output signal which is a function of the magnitude of a load on said load receiving means, said force measuring transducer means including a portion having a downwardly opening recess, a surface connected with the base, a slider disposed in engagement with said surface, said slider having an upwardly opening recess, a force transmitting member having an upper portion disposed in said recess in said force measuring transducer means and a lower portion disposed in said recess in said slider, means for moving said slider relative to said surface with said load receiving means during sideways movement of said load receiving means in a first direction, said recess in said slider being offset relative to said recess in said force measuring transducer means during movement of said slider relative to said surface, said force transmitting member including surface means for interacting with said slider and force measuring transducer means to effect sideways movement of said load receiving means in a second direction to move said recess in said force measuring transducer means into alignment with said recess in said slider.

22. An assembly as set forth in claim 21 wherein said upper portion of said force transmitting member is engaged by said force measuring transducer means and said lower portion of said force transmitting member is engaged by said slider to transmit forces from said load receiving means to said slider to move said slider along said surface during sideways movement of said load receiving means in the first direction.

23. An assembly as set forth in claim 21 wherein said surface means interacts with said slider and force measuring transducer means to move said force measuring transducer means in the second direction relative to said base without moving said slider relative to said base.

24. An assembly as set forth in claim 22 wherein said force transmitting member has a generally spherical configuration.

25. An assembly as set forth in claim 22 wherein said force transmitting member has a generally cylindrical side surface.

26. An assembly comprising load receiving means for receiving a load, said load receiving means being movable sideways relative to a base, first surface means connected with said load receiving means for movement therewith relative to the base, force measuring transducer means connected with the base for providing an output signal which is a function of the magnitude of a load on said load receiving means, said force measuring transducer means including a portion having an upwardly opening recess, a slider disposed in engagement with said first surface means, said slider having a downwardly opening recess, a force transmitting member having an upper portion disposed in said recess in said slider and a lower portion disposed in said recess in said force measuring transducer means, means for holding said slider against movement with said first surface means during sideways movement of said load receiving means in a first direction, said recess in said slider being offset relative to said recess in said force measuring transducer means during movement of said first surface means relative to said slider, said force transmitting member including second surface means for interacting with said slider and force measuring transducer means to effect sideways movement of said load receiving means and slider in a second direction to move said recess in said slider into alignment with said recess in said force measuring transducer means.

27. An assembly as set forth in claim 26 wherein said force transmitting member has a spherical configuration.

28. An assembly as set forth in claim 26 wherein said force transmitting member has a cylindrical side surface.

29. An assembly as set forth in claim 26 wherein said upper portion of said force transmitting member is engaged by said slider and said lower portion of said force transmitting member is engaged by said force measuring transducer means to transmit forces from said force measuring transducer means to said slider to hold said slider against movement with said first surface means during at least a portion of the sideways movement of said load receiving means in the first direction.

30. A method comprising the steps of providing a load receiving means for receiving a load to be weighed, providing a plurality of force transmitting assemblies for supporting the load receiving means during the weighing of a load, each of the force transmitting assemblies including a slider which is disposed in engagement with a base surface or the load receiving means, each of the force transmitting assemblies being adjustable between an offset condition in which the force transmitting assembly transmits vertical and horizontal force components and an aligned condition in which the force transmitting assembly transmits only vertical force components, and changing the condition of at least some of the force transmitting assemblies from offset conditions to aligned conditions while supporting the load receiving means with the force transmitting assemblies, the step of changing the condition of the force transmitting assemblies including the steps of applying a force having a horizontal force component to the load receiving means to move the load receiving means sidewardly in a first direction and, thereafter, allowing the load receiving means to move in a second direction opposite from the first direction under the influence of sideward forces transmitted to the load receiving means through the force transmitting assemblies, said step of changing the condition of the force transmitting assemblies further including the step of providing relative movement between at least one of the sliders and the base or load receiving means during movement of the load receiving means in a first direction and the step of maintaining the one slider stationary relative to the base surface or the load receiving means during movement of the load receiving means in a second direction.

31. An assembly comprising load receiving means for receiving a load to be weighed, said load receiving means being movable relative to a base, a first surface connected with said load receiving means for movement therewith relative to the base, a slider slidable along the base from a first position to a second position, a force transmitting member having an upper portion disposed in engagement with said first surface and a lower portion disposed in engagement with said slider, said force transmitting member being effective to transmit vertical force components which are horizontally offset when said slider is in the first position, said force transmitting member being effective to transmit vertical force components which are vertically aligned when said slider is in the second position, and surface means for sliding said slider along the base from the first position to the second position under the influence of force transmitted from said load receiving means upon movement of said load receiving means relative to the base.

32. An assembly as set forth in claim 31 wherein said surface means is connected with said force transmitting member and is engageable with said slider to prevent relative movement between said slider and said force transmitting member during at least a portion of the movement of said load receiving means.

33. An assembly as set forth in claim 31 wherein the spatial relationship between said slider and force transmitting member remains constant during at least a portion of the movement of said load receiving means relative to the base.

34. An assembly as set forth in claim 31 wherein the spatial relationship between said slider and force transmitting member remains constant during at least a portion of the movement of said load receiving means in a first direction, said force transmitting member moving said load receiving means in a second direction under the influence of horizontally offset vertical force components applied to said force transmitting member upon interruption of movement of said load receiving means in the first direction.

35. An assembly as set forth in claim 31 wherein said force transmitting member has a spherical configuration.

36. An assembly as set forth in claim 31 wherein said force transmitting member is a pin having arcuate upper and lower portions interconnected by a cylindrical body portion.

37. An assembly as set forth in claim 31 wherein said first surface is disposed in a downwardly opening recess having a vertical central axis, said slider including surface means for defining an upwardly opening recess having a vertical central axis, an upper portion of said force transmitting member being disposed in the downwardly opening recess and a lower portion force transmitting member being disposed in the upwardly opening recess in said slider, said load receiving means and slider being positioned with the vertical axes of the recesses horizontally offset when said force transmitting member is effective to transmit vertical force components which are horizontally offset, said load receiving means and slider being positioned with the vertical axes of the recesses coincident when said force transmitting member is effective to transmit vertical force components which are vertically aligned.

38. An assembly as set forth in claim 31 wherein said surface means is disposed in abutting engagement with said slider during sliding of said slider along the base, said surface means being spaced from said slider when said force transmitting member is effective to transmit vertical force components which are vertically aligned.

39. An assembly comprising load receiving means for receiving a load to be weighted, said load receiving means being movable relative to a base, a slider slidable on said load receiving means, said load receiving means being movable relative to said slider from a first position to a second position, a first surface connected with the base, a force transmitting member having an upper portion disposed in engagement with said slider and a lower portion disposed in engagement with said first surface, said force transmitting member being effective to transmit vertical force components which are horizontally offset when said load receiving means is in the first position relative to said slider, said force transmitting member being effective to transmit vertical force components which are vertically aligned when said load receiving means is in the second position relative to said slider, and surface means for sliding said slider on said load receiving means under the influence of force transmitted from the base upon movement of said load receiving means from the first position to the second position relative to said slider.

40. An assembly as set forth in claim 39 wherein said surface means is connected with said force transmitting member and is engageable with said slider to prevent relative movement between said slider and said force transmitting member during at least a portion of the movement of said load receiving means.

41. An assembly as set forth in claim 39 wherein the spatial relationship between said slider and force transmitting member remains constant during at least a portion of the movement of said load receiving means relative to the base.

42. An assembly as set forth in claim 39 wherein the spatial relationship between said slider and force transmitting member remains constant during at least a portion of the movement of said load receiving means in a first direction, said force transmitting member moving said load receiving means in a second direction under the influence of horizontally offset vertical force components applied to said force transmitting member upon interruption of movement of said load receiving means in the first direction.

43. An assembly as set forth in claim 39 wherein said force transmitting member has a spherical configuration.

44. An assembly as set forth in claim 39 wherein said force transmitting member is a pin having arcuate upper and lower portions interconnected by a cylindrical body portion.

45. An assembly as set forth in claim 39, wherein said first surface is disposed in an upwardly opening recess having a vertical central axis, said slider including surface means for defining a downwardly opening recess having a vertical central axis, an upper portion of said force transmitting member being disposed in the downwardly opening recess in said slider and a lower portion force transmitting member being disposed in the upwardly opening recess, said load receiving means and slider being positioned with the vertical axes of the recesses horizontally offset when said force transmitting member is effective to transmit vertical force components which are horizontally offset, said load receiving means and slider being positioned with the vertical axes of the recesses coincident when said force transmitting member is effective to transmit vertical force components which are vertically aligned.

46. An assembly as set forth in claim 39 wherein said surface means is disposed in abutting engagement with said slider during sliding of said slider on said load receiving means, said surface means being spaced from said slider when said force transmitting member is effective to transmit vertical force components which are vertically aligned.

47. A method of installing a scale comprising the steps of providing a platform to receive a load to be weighed, providing a plurality of force transmitting assemblies, each force transmitting assembly being movable between an aligned position in which the force transmitting assembly transmits vertical force components along only a first vertical axis and anyone of a plurality of nonaligned positions in each of which the force transmitting assembly transmits a vertical force component along a second vertical axis which is horizontally offset from the first vertical axis, the second vertical axis for each nonaligned position of a force transmitting assembly being offset in a different direction from the first vertical axis, supporting the platform above a base on the plurality of force transmitting assemblies with at least some of the force transmitting assemblies in different nonaligned positions in which they transmit vertical force components along second axes which are offset in different directions from the first vertical axes, and moving force transmitting assemblies from their different nonaligned positions to their aligned positions while continuing to support the platform on the force transmitting assemblies, said step of moving force transmitting assemblies from their different nonaligned positions to their aligned positions including moving the platform in first and second directions along a first axis and moving the platform in third and fourth directions along a second axis extending transversely to the first axis.

48. A method as set forth in claim 47 wherein said step of moving force transmitting assemblies from their different nonaligned positions to their aligned positions is performed by applying force to only the platform and without applying force directly to the force transmitting assemblies.

* * * * *